US008534730B2

(12) United States Patent
Strohmayr

(10) Patent No.: US 8,534,730 B2
(45) Date of Patent: Sep. 17, 2013

(54) AREAL GRIPPER

(75) Inventor: Michael Strohmayr, München (DE)

(73) Assignee: Deutsches Zentrum fur Luft- und Raumfahrt e.V. (DLR e.V.), Cologne (DE)

( * ) Notice: Subject to any disclaimer, the term of this patent is extended or adjusted under 35 U.S.C. 154(b) by 125 days.

(21) Appl. No.: 13/210,974

(22) Filed: Aug. 16, 2011

(65) Prior Publication Data

US 2012/0043776 A1 Feb. 23, 2012

(30) Foreign Application Priority Data

Aug. 18, 2010 (DE) ......................... 10 2010 034 717
Aug. 18, 2010 (DE) ......................... 10 2010 034 719
Aug. 18, 2010 (DE) ......................... 10 2010 034 720

(51) Int. Cl.
*B25J 15/06* (2006.01)
*B25J 19/02* (2006.01)

(52) U.S. Cl.
USPC .............................. 294/188; 294/185; 901/33

(58) Field of Classification Search
USPC ............ 294/184, 185, 188, 65, 907; 901/33, 901/40; 414/627, 737
See application file for complete search history.

(56) References Cited

U.S. PATENT DOCUMENTS 3,591,228 A * 7/1971 Webb .............................. 294/65
3,643,992 A * 2/1972 Jacobucci ....................... 294/65
3,720,433 A 3/1973 Rosfelder
4,505,505 A * 3/1985 Senaratne ..................... 294/188
4,511,386 A * 4/1985 Kellar et al. .................... 65/273
5,297,830 A * 3/1994 Hoke .............................. 294/65
6,139,079 A * 10/2000 Patel et al. .................. 294/87.1
6,431,623 B1 * 8/2002 Roeters et al. ................ 294/185
2009/0320611 A1 12/2009 Vasarhelyi et al.

FOREIGN PATENT DOCUMENTS

DE 2412979 9/1975
DE 19909998 A1 7/2000
DE 10024764 A1 11/2001
DE 10334458 A1 3/2005
WO WO 2009/035888 A2 3/2009

* cited by examiner

*Primary Examiner* — Dean Kramer
(74) *Attorney, Agent, or Firm* — Hoffmann & Baron, LLP

(57) ABSTRACT

An areal gripper for targeted picking-up, handling and putting down of objects. The areal gripper includes a foil and air-tight frame. The foil includes an elastically deformable, air-permeably perforated first layer, with a first outer surface and a first inner surface, and an elastically deformable, air-impermeable second layer with a second outer surface and a second inner surface. The first inner surface and the second inner surface face each other and are spaced from one another through individually arranged elastically deformable spacers formed between the first inner surface and the second inner surface. The frame laterally surrounds the foil and includes at least one elastically deformable frame section. The frame is connected to circumferential edges of the first layer and the second layer in a circumferentially air-tight manner. The foil or the frame includes at least one connection for a pressure supply to create an underpressure in the intermediate spaces.

20 Claims, 2 Drawing Sheets

AREAL GRIPPER

CROSS REFERENCE TO RELATED APPLICATIONS

This application claims priority to German Patent Application No. DE 10 2010 034 720.5-15 filed on Aug. 18, 2010, German Patent Application No. DE 10 2010 034 719.1-16 filed on Aug. 18, 2010, and German Patent Application No. DE 10 2010 034 717.5-52 filed on Aug. 18, 2010, the disclosures of which are hereby incorporated in their entireties by reference herein.

BACKGROUND

1. Field

The invention relates to an areal gripper for the targeted picking-up, handling and putting down of objects particularly of limp and/or three dimensionally shaped objects. The areal gripper can be employed in all sectors in which (automated) picking-up, handling and putting down of objects takes place for example in automobile production, aircraft manufacture, telemedicine, robotics and others.

2. Brief Discussion of Related Art

Areal grippers are known in the prior art and are for example the subject of the following German patent publications: DE 103 16 125 B3, DE 102 16 221 C1 and DE 10 2004 016 637 A1. The handling of limp objects/work pieces/semi-finished products such as for example glass or carbon fibre mats, cables and others, or objects having a three-dimensional surface with small curvature radii, is not or not satisfactorily possible with the known areal grippers. Up to now, limp work pieces for example are mostly processed manually. During this, especially during the manufacture of complex fibre placements with predetermined fibre orientation inaccuracies in the processing and as a result the failure of a component manufactured therefrom can occur.

The term "limp objects" in this case is to mean objects which are characterized by the characteristics: low modulus of elasticity, low expansion rigidity and large deformations as a result of minor force and torque loading. Limp objects can be distinguished by the geometry into elongated objects (for example solid, hollow cylinders), areal objects (for example mats, foils) or block-shaped objects (for example rubber bearings, pads). Limp objects are also called objects of unstable form or dimensionally stable objects. "Small curvature radii" here means curvature radii in the range from <50 cm, particularly <20 cm, <10 cm, <5 cm, <2 cm, <1 cm, <0.5 cm, or 1 mm.

SUMMARY

The object of the invention is to state an areal gripper that makes possible or improves targeted picking-up, handling and putting down of limp objects and/or of objects having a surface with small curvature radii and which is additionally cost-effective in manufacture.

The invention materializes from the features of the independent Claims set forth herein. Advantageous further developments and configurations are the subject of the dependent Claims set forth herein. Further features, possible applications and advantages of the invention are obtained from the following description, as well as the explanation of exemplary embodiments of the invention which are represented in the Figures.

The object is solved with an areal gripper for the targeted picking-up, handling and putting down of objects which includes at least one foil element with an elastically deformable, air-permeably perforated first layer having a first outer surface and a first inner surface and an elastically deformable, air-impermeable second layer with a second outer surface and a second inner surface, wherein the first and the second inner surface facing each other are connected to each other through individually arranged, elastically deformable spacers formed between the first and second inner surface and are arranged spaced from each other, and wherein between the first and the second inner surface intermediate spaces or hollow spaces are formed.

Furthermore, the areal gripper according to the invention includes an air-tight frame laterally embracing the foil element, which with circumferential edges of the first and of the second layer is circumferentially connected in an air-tight manner, wherein the foil element or the frame includes at least one connection for a pressure supply, by means of which in the intermediate spaces a underpressure can be created. The picking-up of the object is affected by bringing into contact the first outer surface of the foil element with a surface of the object and the creating of a underpressure in the intermediate spaces, so that the object because of the underpressure adheres to the first outer foil. Preferably, the pressure supply in addition to this can also create an overpressure which can be utilized for a targeted putting down.

The areal gripper according to the invention in accordance to Claim 1 is based on a foil element with the features stated above. The method for producing the foil element is the subject of a co-pending German patent application No. DE 10 2010 034 719.1, which is commonly owned by Deutsches Zentrum für Luft- and Raumfahrt e.V. (DLR e.V.) and the disclosure of which is hereby incorporated in its entirety by reference herein. The following section repeats the substantial disclosure points of DE 10 2010 034 719.1.

The application DE 10 2010 034 719.1 discloses a method for the manufacture of the foil element which according to a first alternative includes the following steps: providing an elastically deformable first layer with a first surface, applying first spacers from a curable polymer material in a first arrangement on the first surface, providing an elastically deformable second layer with a second surface, joining of the second surface to the first spacers on their ends facing away from the first surface, moving apart of the first and second layer so that the first and second surface has a predetermined spacing from each other and the first spacers connect the first and second surface, curing of the first spacers, wherein the polymer material of the first spacers is elastically deformable after the curing and the first spacers in a mechanically unloaded state space the first and the second surface at a spacing A. The spacers are preferably arranged individually. They can be randomly shaped (line-shaped, star-shaped, dot-shaped, etc.), particularly also be designed continuously and/or as shapes closed in themselves, for example as circle or oval etc. The provided first and second layer each preferably consists of a polymer material, for example a thermoplastic material, more preferably of a silicone material and preferably has a layer thickness of <15 mm, <10 mm, <5 mm, <2 mm, <1 mm, <0.5 mm, <0.1 mm, or <0.05 mm. The layer thickness of the first and second layer can naturally be selected differently as required. The curable polymer material of the first spacers is preferably likewise a thermoplastic material, or a silicone material, wherein the term "curable" here is to mean that the polymer material of the first spacers at the time of the application onto the first surface is not yet completely cross-linked or not completely vulcanized or not completely cured or cooled down. Applying the first spacers or the curable polymer material is preferentially carried out by means of a pressure, pressing, casting, injection moulding, doctor blade or calendaring method. The first surface and the applied first spacers inter-join following their application, if applicable, a chemical or thermal pre-treatment (heating) of the first surface is required for this purpose. For setting a predetermined deformation behaviour of the foil element same or different elastic materials can be used for the first, the second layer and the first spacers depending on requirement. The directionally dependent (anisotropic) deformation behaviour of the foil element can furthermore be set through the selection of the first arrangement of the first spacers on the first surface. Preferentially, the arrangement of the first spacer has a trapezoidal, annular, elliptic or rectangular, more preferably square geometry. Naturally, depending on requirements, any further first arrangements can be realized.

After the first spacers have been applied to the first surface and have merged with the latter, the second elastically deformable layer with a second surface is provided. Following this, the joining of the second surface to the first spacers on their ends facing away from the first surface takes place. During joining, the polymer material of the first spacers joins together with the second surface. To this end, a physical, chemical or thermal pre-treatment of the second surface is likewise required if applicable. Following this method step a type of “sandwich foil” or a foil composite is created, which includes the first, the second layer and first spacers arranged in between. Between the spacers, the first and the second surface intermediate spaces are formed. After the first spacers have joined together with the second surface the first and the second layer are moved apart so that the first and the second surface have a predetermined spacing from each other and the first spacers join together the first and second surface. The predetermined spacing in each case is to be selected so that the first spacers continue to join the first and the second surface, i.e. do not tear or detach from one or both of the first and second surfaces. Through the moving apart of the first and second layer the first spacers are changed in their external shapes. Typically, a cylindrical or single-shell hyperboloid outer contour of the first spacer materializes in the process. In addition, through the moving apart, the size of the intermediate spaces formed between the first spacers and the first and second surface is set. Via the setting of the shape of the first spacers and the size of the intermediate spaces in turn the direction-dependent (anisotropic) deformation behaviour of the foil element can be predefined or set. The moving apart of the first and the second layer can for example take place by means of two perforated plates which for creating underpressure are connected to a vacuum pump on one of their respective surfaces. These surfaces are brought in contact with surfaces of the first or second layer each located opposite to the first or second surface. The first and second layer adhere to the perforated plates because of the underpressure and can be specifically spaced from each other by means of a corresponding moving apart of the plates. Following the moving apart the curing of the first spacers takes place, wherein the polymer material of the spacers after the curing is elastically deformable and the spacers in a mechanically unloaded state space the first and the second surface at a spacing A. The term “curing” in this case is used in the sense of “cross-linking”, “vulcanizing”, “curing”, or “cooling down” depending on the polymer material used. Following the curing, the polymer material of the first spacers is elastically deformable and substantially dimensionally stable. The foil element, i.e. the layer composite of first and second layer with the first spacers arranged in between, preferably includes a “foil element” thickness of <50 mm, <25 mm, <10 mm, <5 mm, <2 mm, <1 mm, <0.5 mm or <0.1 mm. Furthermore, the spacing A preferably amounts to <15 mm, <10 mm, <5 mm, <3 mm, <2 mm, <1 mm, <0.5 mm, <0.2 mm. Naturally, the choice of the layer thicknesses of the first and second layer, of the spacing A and of the shape and dimensions of the individual first spacers depends on one another and on the present task so that their choice is not randomly but to a person skilled in the art, easily possible. The elastically deformable foil element created with the method includes two layers (the first and the second layer), which through individually arranged suitably shaped spacers are spaced from each other at a spacing A. The characteristics of the mechanical elastic deformability of the foil element can be set through suitable selection of the elastic materials involved, the first arrangement of the first spacers, of the spacing A and of the shape of the first spacers created through the moving apart. Preferably, silicone material is utilized for this.

The application DE 10 2010 034 719.1 furthermore discloses a method for manufacturing the foil element which according to a second alternative includes the following steps: providing an elastically deformable first layer with a first surface, applying individual second spacers from a curable polymer material in a second arrangement on the first surface, providing an elastically deformable second layer with a second surface, applying individual third spacers from a curable polymer material in a third arrangement that is minor-symmetrical to the second arrangement on the second surface, aligning of the first and second layer so that the arrangements of the second and third spacers applied to the first and to the second surface are congruently located opposite one another, joining of the second and third spacers in each case located congruently opposite one another at their respective free ends, moving apart of the first and second layer so that the first and the second surface has a predetermined spacing from each other and the spacers connect the first and second surface, and curing of the spacers, wherein the polymer material of the spacers following the curing is elastically deformable and the spacers in a mechanically unloaded state space the first and the second surface at a spacing A. In contrast with the method described before, the spacers, with this method alternative, are not only applied to the surface of the first layer but the final spacers are obtained from two parts: the second and third spacers, which are applied to the first and second surface in a minor-image arrangement to one another. With this method, the aligning of the first and second layer is thus required, so that the arrangements of the second and third spacers applied to the first and to the second surface are located congruently opposite each other. The connecting of the provided first and second layer in this case is obtained through the joining of the second and third spacers in each case located congruently opposite each other at their respective free ends. Preferably, the spacers prior to the joining are treated thermally, chemically, mechanically, with electromagnetic radiation, with plasma or with particle radiation joining, in order to promote the joining of the spacers and/or a shape change of the spacers during the moving apart of the first and second layer. In a method version, the joining of the second and the third spacers takes place under mechanical vibrating of the spacers or of the first or second layer in each case connected to these. The second and the third spacers preferably have an identical shape, particularly a semi-spherical shape, cone shape, drop shape, cylinder shape, cuboid shape or a single-shell hyperboloid outer contour (shape). In this method alternative, too, the composite of spacers and first and second layer is preferably heated prior to the moving apart of the first and second layer and after the moving apart, cooled or cooled down.

The further disclosure of the application DE 10 2010 034 719.1 with respect to the foil element described therein and its manufacture is herewith fully included in the present disclosure content. Reference is made in particular to the explanations describing the foil element and the explanatory Figures of the application DE 10 2010 034 719.1.

Now back to the present invention. In the present application the foil element from the application DE 10 2010 034 719.1 is firstly supplemented by a frame, which is circumferentially connected in an airtight manner to the foil element or the circumferential edges of the first and the second layer of the foil element, and secondly supplemented by at least one connection, i.e. at least one opening in one of the layers, preferably the second layer, or in the frame itself, in order to connect a pressure supply, by means of which at least one underpressure can be created in the intermediate spaces of the foil element. For creating the underpressure or an overpressure a fluid means can be brought out or brought in through the pressure supply. A fluid medium in this case is to mean a substance which does not pose any resistance to any slow shearing and thus has a finite viscosity. Fluid media therefore include particularly gases and liquids, but also gels.

Through the elastic deformability of the foil element preferably produced from a polymer material or a silicone material, the foil element upon underpressure introduced into the foil element easily hugs an almost randomly structured and shaped object surface. The perforation, i.e. the size, the shape and the surface density of the perforation openings is suitably configured depending on the task and other requirements. Thus it is more preferably possible to specifically handle limp objects or objects with a curved surface.

The frame is preferably designed rigidly. In a preferred further development of the areal gripper the frame surrounding the foil element is designed elastically deformable at least in a frame section. Thus, the areal gripper can for example be folded open in the manner of "webbing" between robot gripping fingers and thus promotes for example the handling of limp objects with a robot gripper.

A particularly preferred further development of the areal gripper is based on the integration of a sensor element for capturing tactile sensations in the areal gripper. Such a tactile sensor is the subject of a co-pending German patent application No DE 10 2010 034 717.5, which is commonly owned by Deutsches Zentrum für Luft- and Raumfahrt e.V. (DLR e.V.) and the disclosure of which is hereby incorporated in it entirety by reference herein. The following section repeats the substantial disclosure points of DE 10 2010 034 717.5.

The sensor element for capturing tactile sensations disclosed in DE 10 2010 034 717.5 includes: a non-conductive, elastically deformable first layer with a first surface, a non-conductive elastically deformable second layer with a second surface, wherein the first and the second surface are arranged facing each other and spaced from each other through elastically deformable spacers designed between the first and second surface and are connected to each other, one or several elastically deformable electrically conductive first lines, which are arranged/fixed on the first surface, and elastically deformable, electrically conductive second lines, which are arranged/fixed on or at the second surface, wherein first and second lines cross at crossing points. Preferably, the first/second lines in regions of the first/second surface are arranged between the spacers. This applies more preferably to the crossing points. The first/second lines however can also run in sections or partially below the spacers. The tactile sensor element is based on the foil element disclosed in the application DE 10 2010 034 719.1. The sensor element disclosed in the application DE 10 2010 034 717.5 supplements the foil element described in the application DE 10 2010 034 719.1 with first and second elastically deformable, electrically conductive lines, which are arranged on or at the first or second surface, wherein first and second lines cross at crossing points. Through the arrangement of elastically deformable electrically conductive lines the foil element becomes an areal tactile sensor element, which uses the particular elastic deformability and the construction of the foil element to improve the direction-dependent resolution when capturing tactile sensations. The direction-dependent (anisotropic) elastic deformability of the foil element can be adjusted during the manufacture as described in the application DE 10 2010 034 719.1 through a suitable selection of the involved elastic materials (for first and second layer, for the spacers, as well as for the elastic lines), through a suitable selection of the shape of the spacers, of their arrangement and of their dimensions, and through a suitable selection of the spacing with which the first and the second surface are spaced from each other. With the direction-dependent elastic deformability of the foil element the direction-dependent sensitivity of the sensor element with respect to the capture of tactile sensations is also determined in the present case. Thus, the sensor element can be suitably embodied depending on the requirements in terms of the resolution of tactile sensations. In a simple embodiment of the sensor element the spacers are arranged between the first and the second surface as grid points of a two-dimensional orthogonal, more preferably Cartesian grid. Preferably, the first lines in this case are arranged parallel to one another and the second lines parallel to one another, while the first and second lines run orthogonally to one another. Naturally, any further arrangements of the spacers, for example with concentric, rectangular geometry are possible with suitable arrangement of the first and second lines depending on the task. Furthermore, the elastic spacers themselves can assume almost any shapes, for example dot-shaped, star-shaped, elongated, linear also shapes closed in themselves such as circles, ellipses, etc. The areal tactile resolution of the sensor element is determined through the surface density of the crossing points, particularly the cross points arranged between the spacers. Each crossing point quasi constitutes a tactile sensor cell. If the surface density of the crossing points is large in a surface region, the areal tactile resolution of the sensor element for this surface region is high. If the surface density of the crossing points in a surface region is small, the areal tactile resolution of the sensor elements for this surface region is small. In a further preferred embodiment of the present sensor element the first and the second lines are spaced from one another at the crossing points in a mechanically unloaded state of the sensor element. The term "mechanically unloaded state" means that no tactile sensations (forces) act on the sensor element. Through a force (tactile sensation) exerted on the sensor element the first and second lines approximate one another at the crossing points, which upon further approximation can lead to their contacting and upon still further approximation to an elastic deformation of the first and second lines. This approximation of the first and second lines at the crossing points has measurable effects that are capacitive or affect the electric conductivity of the first and second lines, by means of which the introduced tactile sensations can be evaluated in the known manner. Upon disappearance of the exerted force the "mechanically unloaded state" is re-established with a directionally-dependently known, controllable hysteresis that has to be taken into account during the evaluation of the measurable effects stated above. In an alternative configuration of the sensor element the first and the second lines touch one another at the crossing points even in the mechanically unloaded state of the sensor element. Through the exertion of an external mechanical force (tactile sensation) on the sensor element the first and second lines are now elastically deformed at the respective crossing points concerned, which in each case causes a measurable change of the electric conductivity of the lines concerned. Preferably, the first and the second layer and the spacers consist of a polymer material, more preferably of a silicone material. Furthermore, the first and the second lines preferably consist of an electrically conductive polymer material such as cis-polyacetylene (PA), trans-polyacetylene (PA) or poly-para-phenylene (PPP). Alternatively, the first and second lines can each consist of a non-conductive and elastically deformable line body with electrically conductive particles embedded therein. A particularly preferred further development of the sensor element is characterized in that the sensor element is formed of several sensor elements arranged on top of one another, i.e. in that several foil elements equipped with electric lines are arranged on top of one another.

The application DE 10 2010 034 717.5 furthermore discloses a tactile sensor with a sensor element according to the above explanations and with an evaluation module that can be connected to the first and second lines, wherein the evaluation module is a capacitance module with which electrical capacitance changes on individual crossing points of the first and second lines can be determined, and/or a resistance measuring module, with which an electrical transition resistance at individual crossing points of the first and second lines can be determined, and/or a resistance measuring module, with which electrical line resistances of the individual first and second lines can be determined. From the determined capacitance changes or transition resistance changes or line resistance changes the location or the surface of the tactile sensation concerned on the sensor element as well as the force ingress connected with the tactile sensation can be determined.

The disclosure of DE 10 2010 034 717.5 with respect to the sensor element and the method for its manufacture described therein is herewith fully included in the present disclosure content. Reference is particularly made to the explanations describing the sensor element and the explanatory Figures of DE 10 2010 034 717.5.

Now back again to the present invention. An advantageous further development of the areal gripper according to the invention is characterized in that for determining tactile sensations with the foil element of the areal gripper one or several elastically deformable electrically conductive first lines are arranged on or at the first inner surface, elastically deformable, electrically conductive second lines, are arranged on or at the second inner surface, wherein first and the second lines cross at crossing points and the first and second lines can be connected to an evaluation unit. As described in DE 10 2010 034 717.5 the first and second lines in conjunction with the foil element form a tactile sensor device, which has a number of tactile pixels (so-called taxels) corresponding to the number of crossing points. The surface density of the crossing points and thus the surface density of the taxels determines the areal resolution of the areal gripper for tactile sensations. In a preferred embodiment the surface density of the taxels is constant, it can however suitably vary areally however depending on requirement. By means of the integrated tactile sensor device the areal gripper is enabled to capture tactile sensations during picking up, handling and putting down of objects, in order to make possible a continuous documentation of a manufacturing process or to utilize this information for controlling the picking-up, handling and putting down of objects. This makes possible a multiplicity of possibilities for activating or regulating handling processes and can additionally supply a substantial contribution for the quality assurance during manufacturing processes.

As described in more detail in DE 10 2010 034 719.1 and DE 10 2010 034 717.5 the first and the second layer as well as the spacers preferably consist of a polymer material or of silicone. Furthermore, the first and the second lines preferably consist of an electrically conductive polymer material such as cis-polyacetylene, trans-polyacetylene or poly-para-phenylene or of an electrically non-conductive elastically deformable material with embedded electrically conductive particles.

In a simple but effective embodiment of the areal gripper according to the invention the spacers are arranged as grid points of a two-dimensional orthogonal, more preferably of a Cartesian grid, wherein the first lines are arranged parallel to one another and the second lines parallel to one another, and the first and second lines are arranged orthogonally to one another. In a mechanically unloaded state the first and second lines are arranged on the crossing points in a mechanically unloaded state, preferably spaced from one another.

If a tactile sensation is applied to the foil element, for example upon "gripping" or "picking up" of the object, the first and second lines are moved towards one another, which upon further approximation can lead as far as to their contacting and with still further approximation to an elastic deformation of the first and second lines. This approximation of the first and second lines at the crossing points has measurable effects that are capacitive or affect the electric conductivity of the first and second lines, by means of which the introduced tactile sensations can be evaluated in the known manner. Upon disappearance of the exerted force the "mechanically unloaded state" materializes with a directionally-dependent known, controllable hysteresis that has to be taken into account when evaluating the measurable effects stated above.

To evaluate the electrical effects the evaluation unit of the areal gripper preferably includes a capacitance measuring module with which electrical capacitance changes at individual crossing points of the first and second lines can be determined, and/or a first resistance measuring module, with which changes of an electrical transition resistance at individual crossing points of the first and second lines can be determined, and/or a second resistance measuring module, with which changes of electrical line resistances of the individual first and second lines can be determined.

In a further particularly preferred embodiment the areal gripper includes a control unit, with which an underpressure or overpressure created by the pressure supply is controllable dependent on capacitance changes and/or changes of the transition resistance and/or changes of the line resistance determined by the evaluation unit. Thus it is possible to adjust a specific gripping or handling force or a corresponding underpressure in such a manner that a sliding off or sliding away of the object from the areal gripper is prevented and thus safe gripping/handling of the object is possible.

The areal gripper according to the invention additionally preferably includes one or several of the following features:

- at least one of the first and the second layers that has a layer thickness of <15 mm, <10 mm, <5 mm, <2 mm, <1 mm, <0.5 mm, <1 mm, <0.1 mm or <0.05 mm each;
- the foil element including first and second layers and spacers arranged in between having a thickness of <50 mm, <25 mm, <10 mm, <5 mm, <2 mm, <1 mm, <0.5 mm or <0.1 mm;
- the spacing of the first to the second inner surfaces is <15 mm, <10 mm, <5 mm, <3 mm, <2 mm, <1 mm, <0.5 mm, or <0.2 mm;

the spacers are arranged as grid points of a two-dimensional Cartesian grid, having a grid constant in the range from: <5 mm, <3 mm, <2 mm, <1 mm, <0.5 mm or <0.1 mm;

the first and second lines are arranged in regions of the first and second inner surfaces between the spacers; and the first and the second inner surfaces are spaced from each other with an areally constant spacing.

In a further particularly preferred embodiment the areal gripper includes several foil elements arranged next to one another, which are each preferably surrounded by an elastically deformable frame and each have a connection for a compressed-air system. With such a areal gripper the individual foil elements can be differently supplied with underpressure or overpressure depending on task and requirement. Thus, picking-up or putting down of limp objects for example can take place at different times depending on the position of the gripping surface of the areal gripper. If the individual foil elements additionally have the elastically deformable first and second lines, the handling, particularly the pressure supply of the individual foil elements can additionally take place dependent on the tactile sensation captured by the respective foil element. The multiplicity of the foil elements is preferably surrounded by a rigid frame.

Further advantages, features and details are obtained from the following description in which, making reference to the drawing, an exemplary embodiment is described in detail. Described and/or depicted features form the subject of the invention by themselves or in any practical combination, if applicable, even independently of the Claims, and can more preferably also be additionally the subject of one or several separate patent applications. Same, similar and/or functionally same parts are provided with the same reference characters.

DETAILED DESCRIPTION

Figure 1:
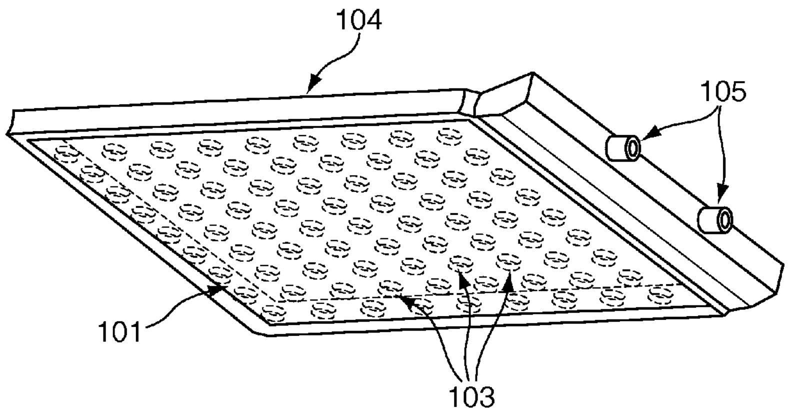
FIG. 1 shows an oblique view of a schematically represented areal gripper according to the invention.

FIG. 1 shows an oblique view of a schematically represented areal gripper according to the invention. The basis of the elastically deformable areal gripper according to the invention with integrated tactile sensor device is the foil element described in DE 10 2010 034 719.1 and the sensor element described in DE 10 2010 034 717.5. The first layer 101 of the foil element or of the sensor element to this end is perforated, i.e. provided with openings. The size and surface density of these perforation openings in the first layer 101 depends on the application or the requirements and is to be selected accordingly. The lateral edges 104 of the foil element or of the sensor element are sealed off air-tight with a frame 104 laterally surrounding the foil element. Within the foil element the spacers 103 in this case are arranged individually and regularly (in the manner of a square grid). The first 101 and second 102 layer of the foil element are arranged spaced from each other through the spacers 103 in the mechanical state of rest. Between the first 101 and the second 102 layer and the spacers 103, intermediate spaces/hollow spaces are formed. Here, the frame 104 includes two connections 105 for connecting a compressed-air system, with which in the intermediate spaces/hollow spaces an underpressure or an overpressure can be specifically created. In the present exemplary embodiment the frame 104 is designed as sturdy plastic frame. If air is now sucked from the hollow space of the foil element, an underpressure is created on the perforation openings of the first layer 101 which in turn can cause adhering to an object surface.

Figure 2:
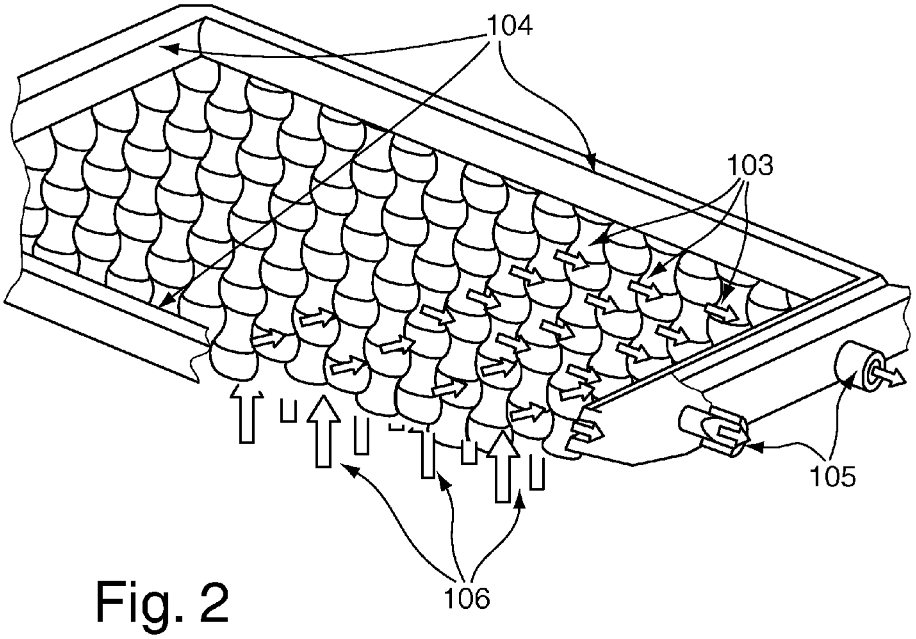
FIG. 2 shows an oblique view of the areal gripper for explanation of an airflow through the areal gripper upon creation of an underpressure.

FIG. 2 shows an oblique view of the areal gripper for explaining an air flow through the areal gripper upon the creation of an underpressure. If an underpressure is created on the connections 105, an underpressure develops in the intermediate spaces of the foil element which results in that air from the outside is sucked into the foil element through the perforation openings. The airflow that materializes in the event that no object is brought into contact with the first surface, is indicated in FIG. 2 by the arrows. If an object is to be picked up with the areal gripper, the elastically deformable foil element adapts to the surface of the object. The object continues to adhere to the foil element or to the areal gripper because of an adequate underpressure and can thus be handled. Depending on weight of the object, a corresponding underpressure is required. The foil element thus acts like an areal underpressure gripper.

The main advantage of the described areal gripper is its deformability, for example the areal gripper can offset different spacings between fibre mat and target surface, which is substantially based on the characteristics of the foil element described in DE 10 2010 034 719.1.

Figure 3:
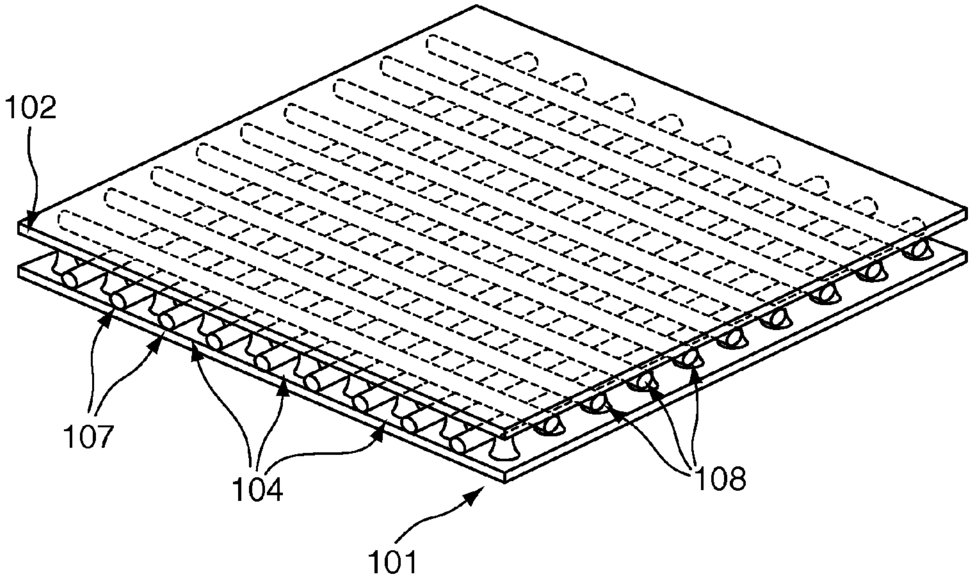
FIG. 3 shows a schematic representation of the foil element with elastic conductors for capturing tactile sensations.
Figure 4:
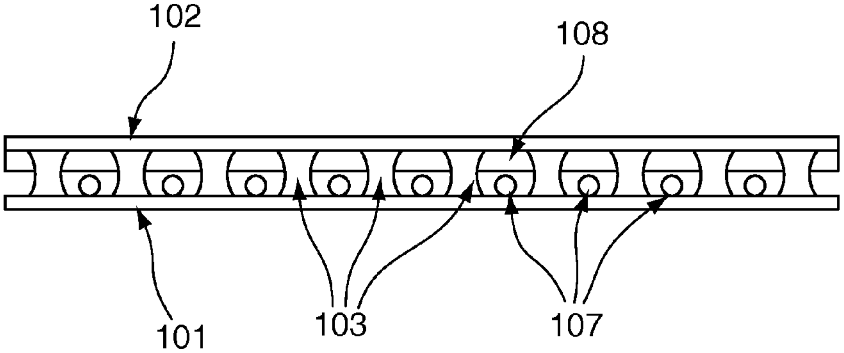
FIG. 4 shows a lateral view of the foil element of FIG. 3.

Furthermore, it is possible to integrate a sensor device in the areal gripper according to the invention, which additionally makes possible capturing tactile sensations. This sensor device is described in more detail in DE 10 2010 034 717.5 to which reference is made at this point. FIG. 3 shows a schematic representation of the foil element of the areal gripper with such a tactile sensor device including elastically deformable first 107 and second 108 conductors. FIG. 4 shows a lateral view of the foil element of FIG. 3.

The foil element shown in FIG. 3 and FIG. 4 consists of a first perforated elastically deformable layer 101 and a second elastically deformable layer 102 without perforation openings, which are arranged spaced from one another through individually arranged elastically deformable spacers 103. To capture tactile sensations, elastically deformable first 107 and second 108 electrically conductive lines are arranged in each case on the surfaces of the foil element located inside, so that they cross at crossing points. In the mechanically unloaded state, the first 107 and second 108 lines are spaced from one another at the crossing points. Each crossing point thus forms a pixel sensitive to a tactile sensation (so-called taxel). The evaluation of an introduced tactile sensation is carried out by the evaluation unit connected to the first 107 and second 108 lines. To this end, said evaluation unit includes a capacitance measuring module, with which the electrical capacitance changes at individual crossing points of the first and second lines can be determined, and/or a first resistance measuring module, with which changes of an electrical transition resistance at individual crossing points of the first and second lines can be determined, and/or a second resistance measuring module, with which changes of electrical line resistances of the individual first and second lines can be determined.

The combination of the preferably polymer-based elastically deformable foil element and the tactile sensor device makes possible for example a continuous documentation of a handling process and can thus provide a valuable contribution to the quality assurance for example in the automated carbon fibre processing. By capturing tactile information during the handling of such fibres it can for example be ensured that the fibre mats during the processing have not become distorted and the predefined fibre orientation has been maintained.

LIST OF REFERENCE NUMBERS

101 First layer
102 Second layer
103 Spacer
104 Frame
105 Connection for a compressed-air system
106 Air or generally a fluid medium that flows into or through the or out of the foil element
107 Elastically deformable, electrically conductive first lines
108 Elastically deformable, electrically conductive second lines

The invention claimed is:

1. An areal gripper for targeted picking-up, handling and putting down of objects, the areal gripper comprising:
- a foil element comprising:
  - an elastically deformable, air-permeably perforated first layer, with a first outer surface and a first inner surface; and
  - an elastically deformable air-impermeable second layer with a second outer surface and a second inner surface, wherein the first inner surface and the second inner surface face one another and are spaced from one another through individually arranged elastically deformable spacers formed between the first inner surface and second inner surface, and wherein intermediate spaces are formed by the spacers between the first inner surface and the second inner surface; and
- an air-tight frame laterally surrounding the foil element that comprises at least one elastically deformable frame section, wherein the frame is connected to circumferential edges of the first layer and of the second layer in a circumferentially air-tight manner, and wherein the foil element or the frame comprises at least one connection for a pressure supply to create an underpressure in the intermediate spaces.

2. The areal gripper according to claim 1, wherein to determine tactile sensations the foil element comprises:
- one or several elastically deformable, electrically conductive first lines arranged on or at the first inner surface;
- elastically deformable, electrically conductive second lines arranged on or at the second inner surface; and
- wherein first lines and the second lines cross at crossing points and are connectable to an evaluation unit.

3. The areal gripper according to claim 2, wherein the first lines and the second lines at the crossing points in a mechanically unloaded state are arranged spaced from one another.

4. The areal gripper according to claim 2, wherein the first lines and the second lines consist of an electrically conductive polymer material.

5. The areal gripper according to claim 4, wherein the polymer material is one of cis-polyacetylene, trans-polyacetylene and poly-para-phenylene.

6. The areal gripper according to claim 2, wherein the spacers are arranged as grid points of a two-dimensional orthogonal grid, wherein the first lines are arranged parallel to one another and the second lines are arranged parallel to one another, and wherein the first lines and the second lines are arranged orthogonally to one another in the intermediate spaces between the spacers.

7. The areal gripper according to claim 6, wherein the orthogonal grid is a Cartesian grid.

8. The areal gripper according to claim 2, wherein the evaluation unit comprises at least one module of a group comprising:
- a capacitance measuring module to determine electrical capacitance changes on individual crossing points of the first lines and second lines;
- a first resistance measuring module to determine electrical transition resistance changes at individual crossing points of the first lines and second lines; and
- a second resistance measuring module to determine electrical line resistance changes of the individual first lines and second lines.

9. The areal gripper according to claim 8, further comprising a control unit to control the pressure supply dependent on at least one of capacitance changes, transition resistance changes and line resistance changes determined by the evaluation unit.

10. The areal gripper according to claim 2, wherein the first lines and the second lines consist of an electrically non-conductive elastically deformable material with embedded electrically conductive particles.

11. The areal gripper according to claim 1, wherein the first layer, the second layer and the spacers consist of polymer material.

12. The areal gripper according to claim 1, wherein at least one of the first layer and the second layer includes a layer thickness selected from a group consisting of: <15 mm; <10 mm; <5 mm; <2 mm; <1 mm; <0.5 mm; <1 mm; <0.1 mm; and <0.05 mm.

13. The areal gripper according to claim 1, wherein the intermediate spaces formed by the spacers are in communication.

14. The areal gripper according to claim 1, wherein the foil element is deformable to conform to a surface of an object.

15. The areal gripper according to claim 1, wherein the first layer, the second layer and the spacers consist of silicone.

16. The areal gripper according to claim 1, wherein the foil element including the first layer, the second layer and the spacers has a thickness selected from a group consisting of: <50 mm; <25 mm; <10 mm; <5 mm; <2 mm; <1 mm; <0.5 mm; and <0.1 mm.

17. The areal gripper according to claim 1, wherein spacing between the first inner surface and the second inner surface is one selected from a group consisting of: <15 mm; <10 mm; <5 mm; <3 mm; <2 mm; <1 mm; <0.5 mm; and <0.2 mm.

18. The areal gripper according to claim 1, wherein the spacers are arranged as grid points of a two-dimensional Cartesian grid having a grid constant selected from a group consisting of: <5 mm; <3 mm; <1 mm; <0.5 mm; and <0.1 mm.

19. The areal gripper according to claim 1, wherein the first lines and the second lines are arranged in regions of the first inner surface and the second inner surface between the spacers.

20. The areal gripper according to claim 1, wherein the first inner surface and the second inner surface are spaced from one another with a constant spacing.

* * * * *